Nov. 13, 1962  G. W. PURDY  3,063,178
LAND LEVELER WITH TRIP BLADES
Filed May 9, 1961  3 Sheets-Sheet 1
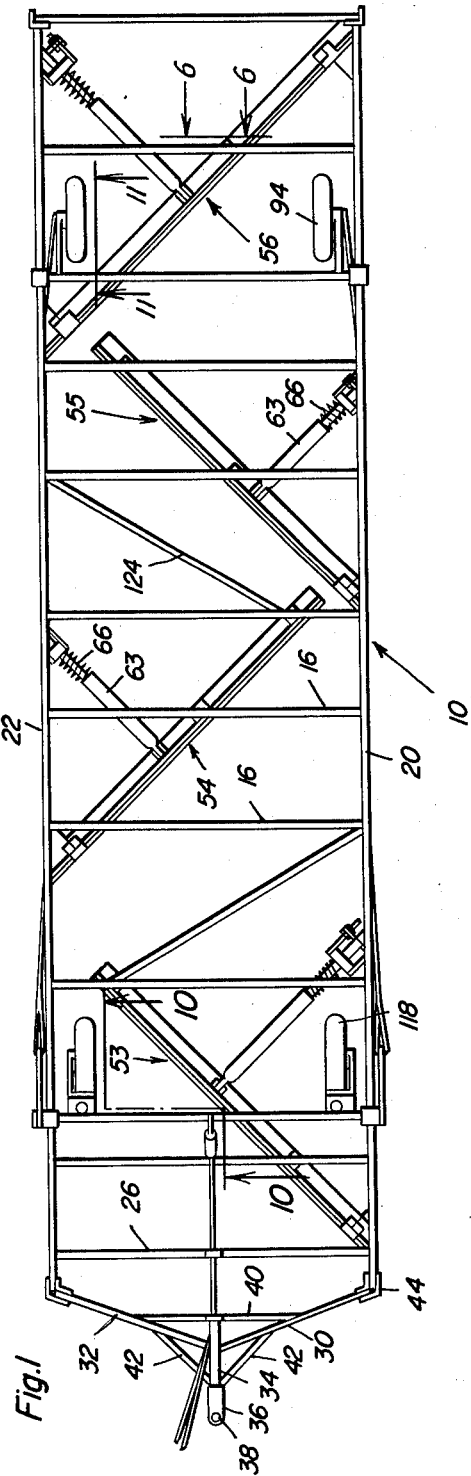
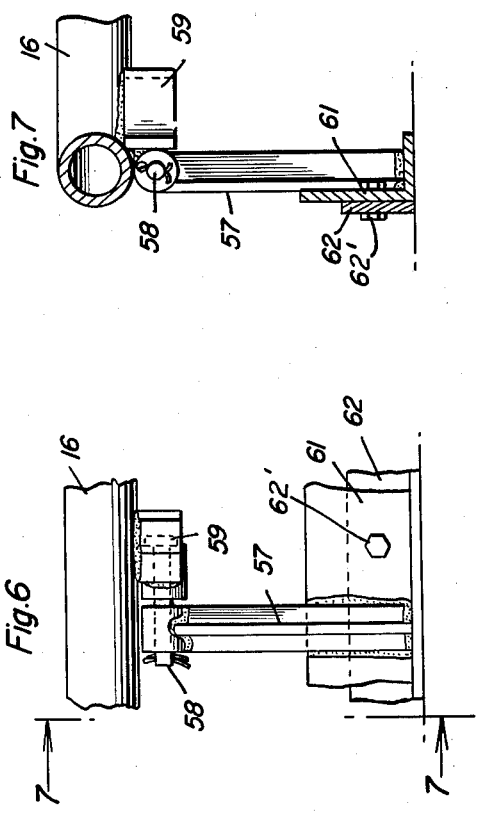
George W. Purdy
INVENTOR.

Nov. 13, 1962    G. W. PURDY    3,063,178
LAND LEVELER WITH TRIP BLADES
Filed May 9, 1961    3 Sheets-Sheet 2
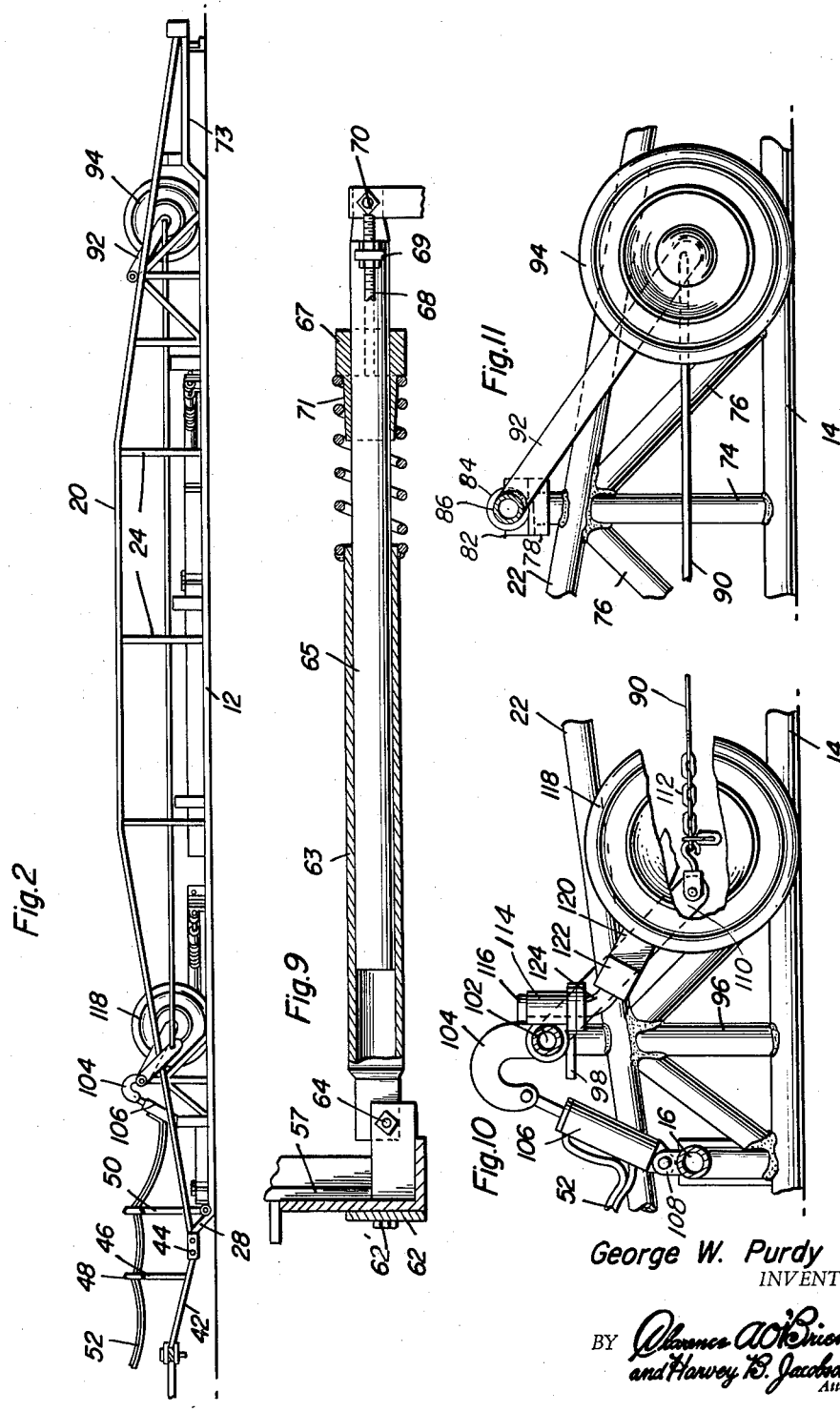
George W. Purdy
INVENTOR.
BY *Clarence A. O'Brien*
and *Harvey B. Jacobson*
Attorneys Nov. 13, 1962 G. W. PURDY 3,063,178
LAND LEVELER WITH TRIP BLADES
Filed May 9, 1961 3 Sheets-Sheet 3
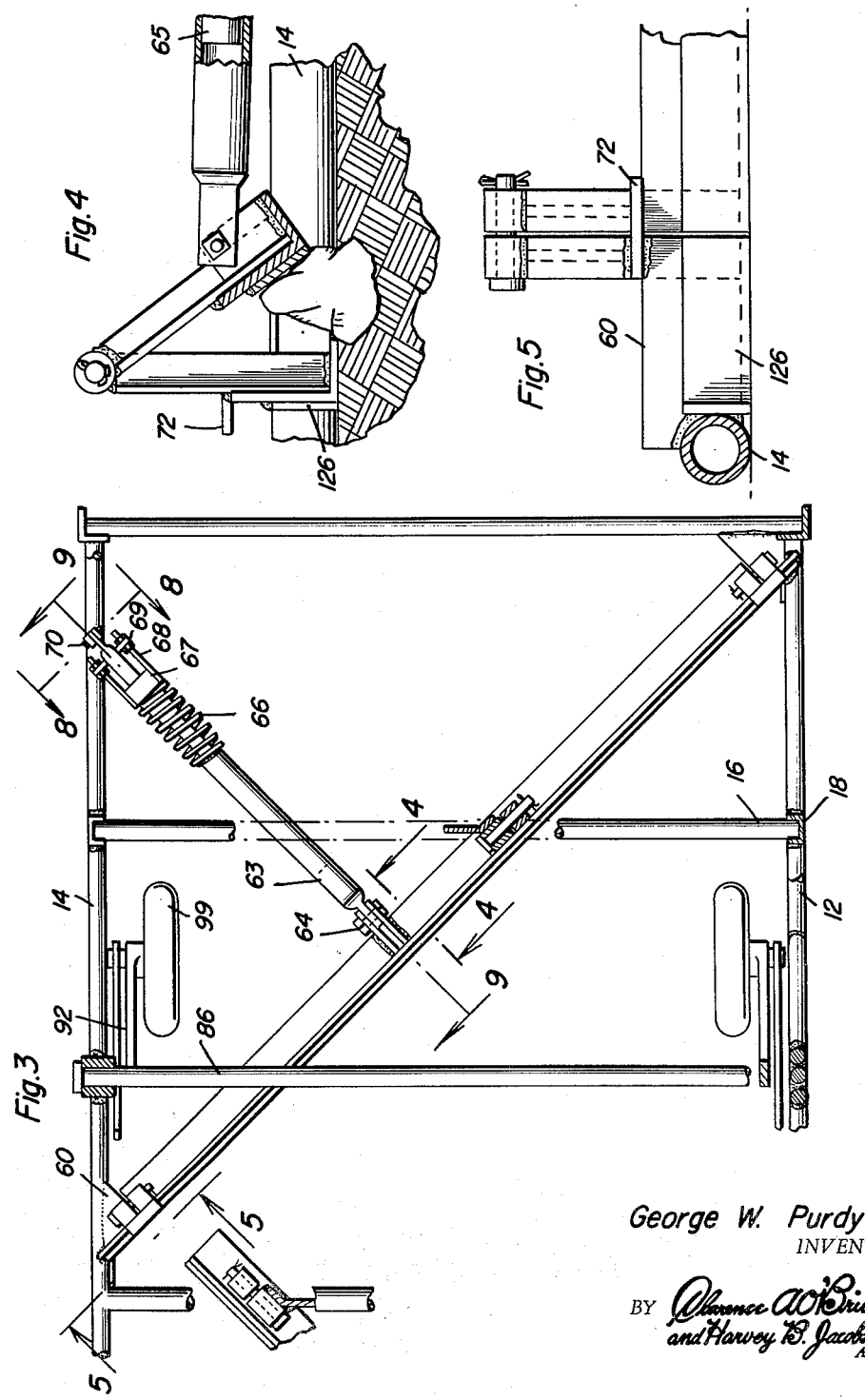
George W. Purdy
INVENTOR.
BY
Clarence A. O'Brien
and Harvey B. Jacobson
Attorneys

3,063,178
LAND LEVELER WITH TRIP BLADES
George W. Purdy, 601 S. Jefferson St., De Witt, Ark.
Filed May 9, 1961, Ser. No. 108,894
14 Claims. (Cl. 37—152)

The present invention generally relates to a land leveler and more particularly to such a device that is equipped with trip blades thereby enabling the device to be effectively employed in areas having stumps or other obstructions whereby the blades will pivot rearwardly about a horizontal axis adjacent the top edge thereof thereby enabling the land leveler to pass over the stump without damage to the land leveler. The structure disclosed in this application represents novel improvements over that disclosed in co-pending application Serial No. 855,923, filed November 27, 1959 for Land Leveler.

In certain localities, timber land has been cleared so that it had to be used for farming purposes. When such land is cleared there quite often remains a number of stumps which are relatively short. However, such stumps tend to prevent effective levelling with conventional land levelers since it is either necessary to pass around the stump or elevate the entire leveler to a position above the stump. However, in the present invention, it is the primary object to provide a land leveler having a plurality of angularly disposed trip blades mounted thereon which are capable of rearward swinging movement about a generally horizontal axis thus enabling the surface of the soil on all sides of the stump to be level and still enabling the leveler to pass over the stump.

The land leveler is quite useful in those areas requiring that the surface of the soil be completely leveled prior to planting. For example, this is necessary in the growing of rice since the levees employed for irrigation flooding may be more easily formed by following the high spots in a field in the usual manner of building level levees in a flood type irrigation system which is employed in growing rice. The leveling operation is carried out by a plurality of angulated blades mounted on an elongated frame in longitudinally spaced relation whereby the blades will move the soil a plurality of times back and forth in a lateral direction during passage of the leveler over the ground surface thereby effectively filling in the low spots and cutting down the high spots.

Another object of the present invention is to provide a land leveler in which the plurality of blades are pivotally supported about a generally horizontal axis along the top of the blades together with a spring biased mechanism connected thereto for retaining the blades in operative position but enabling them to swing rearwardly upon engagement with a stump or the like.

A further object of the present invention is to provide a land leveler having a plurality of swingable blades attached to a frame which is supported by four corner wheels that are simultaneously and vertically movable whereby the supporting wheels will support the land leveler above the ground surface for over the road maneuvering, the elongated frame having side skids which actually skid on the ground surface during the leveling operation for assuring proper orientation of the blades in relation to the ground surface.

A still further object of the present invention is to provide a land leveler in accordance with the preceding objects in which the angulated blades provide movement of the soil from blade to blade thereby permitting the leveler to be employed for leveling ground in moist or wet condition which is incapable of being leveled by levelers having blades extending transversely to or perpendicularly to the line of travel.

Another very important feature of the present invention is to provide a land leveler in which the vertically adjustable front wheels are mounted on the frame with a caster assembly that enables the front wheels to pivot or swing when the tractor or towing vehicle proceeds around a corner and this structure also enables a device to be towed over the road when all of the wheels are lowered for elevating the frame.

Another object of the present invention resides in its simplicity of construction, rigidity, effectiveness for leveling and its generally inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the land leveler of the present invention;

FIGURE 2 is a side elevational view of the construction of FIGURE 1;

FIGURE 3 is an enlarged top plan view of the rear portion of the leveler illustrating the details of construction of one of the trip blades;

FIGURE 4 is a detailed sectional view taken substantially upon a plane passing along section line 4—4 of FIGURE 3 illustrating the structural details of the blade;

FIGURE 5 is a detailed sectional view taken substantially upon a plane passing along section line 5—5 of FIGURE 3 illustrating further structural details mounting the blades from the frame;

FIGURE 6 is a detailed sectional view taken substantially upon a plane passing along section line 6—6 of FIGURE 1 illustrating the hinge connection between the blades and the cross frame members;

FIGURE 7 is a sectional view taken substantially upon a plane passing along section line 7—7 of FIGURE 6;

FIGURE 8 is a detailed sectional view taken substantially upon a plane passing along section line 8—8 of FIGURE 3 illustrating the connection of the spring loaded mechanism to the frame;

FIGURE 9 is a longitudinal, vertical sectional view taken substantially upon a plane passing along section line 9—9 of FIGURE 3 illustrating the details of the spring loaded mechanism;

FIGURE 10 is a detailed sectional view illustrating the construction arrangement of the front wheel; and FIGURE 11 is a detailed sectional view taken substantially upon a plane passing along section line 11—11 of FIGURE 1 illustrating the structure of the rear wheels.

Referring now specifically to the drawings, the numeral 10 generally designates the land leveler of the present invention which includes a pair of elongated and parallel bottom side frame rails 12 and 14 which may be in the form of skids and which may conveniently be in the form of rigid tubular pipe members. Interconnecting the side frame rails 12 and 14 at longitudinally spaced points are transverse tubular frame rails 16 secured to upstanding brackets 18 carried by the side frame rails or skids 12 and 14 thus providing a rigid framework. Extending longitudinally above the side frame rails 12 and 14 is a pair of arch rails or truss rails 20 and 22 each having a plurality of brace members 24 extending between the rails 12 and 20 and the rails 14 and 22 respectively. This truss-work also serves to rigidify the entire framework.

The forward end of the frame and particularly the rails or skids 12 and 14 is provided with a transverse forward rail 26 similar to rails 16 and the forward ends of the rails 12 and 14 are turned as indicated by numeral 28. The upturned ends 28 are pivotally connected to converging rails 30 and 32 that are joined to a forwardly extending tongue 34 having a U-shaped yoke or spaced plate 36 on the outer end thereof. The plates 36 have aligned apertures 38 therein for receiving a drawbar therebetween whereby a pin may be inserted through the apertures 38 and an aperture in the drawbar for attaching the tongue 34 to the draw bar of a tractor or other suitable towing vehicle. The rear end of the tongue 34 is provided with a transverse brace member 40 interconnecting the converging rails 30 and 32. Also, brace members 42 are provided between the rail 30 and the tongue 34 and the rail 32 and tongue 34 thus providing a rigid substantially A-shaped attachment having rearwardly extending lugs 44 on the rear ends thereof which are pivotally engaged with the forward ends of the upturned end portions 28 of the rails 12 and 14 whereby only longitudinal thrust is exerted on the framework by the towing tractor or other towing implement.

The transverse brace member 40 is provided with an upstanding standard 46 having a loop 48 on the top thereof and the transverse rail 26 is provided with a similar upstanding brace or standard 50 which supports hydraulic fluid pressure lines 52 extending rearwardly from the tractor to the land leveler.

Supported behind the forward end of the land leveler is a plurality of blades generally designated by numerals 53, 54, 55 and 56. The blade 53 is disposed forwardly of the left front wheel and each of the blades has one end thereof disposed adjacent the side rail and the other end thereof spaced therefrom. Also, each of the blades has a longitudinal axis inclined longitudinally and rearwardly of the framework and forms an acute occluded angle with its respective side rail and the blades are disposed in staggered relation as illustrated in FIGURE 1. Thus, material engaged by the blades will be moved longitudinally and also laterally and discharged from the free end of the blade which is spaced from the opposite side frame rail. Thus, the material is rolled laterally four times during passage of the land leveler end, of course, is also moved to a certain extent in a longitudinal direction. Each of the blades 53–56 are supported by depending brackets 57 supported by a hinge pin 58 which in turn is carried by a bracket or lug 59 attached to the transverse frame members 16 or to gusset plates 60 where the blade extends to the side rails 12 or 14.

Attached to the lower ends of the brackets 57 as by welding or the like is an elongated L-shaped or angle iron member 61 having the short leg thereof extending horizontally under the bracket 57. This forms a backing member for the cutting blade 62 which is disposed against the forward surface of the angle iron member 61 and which is detachably supported in place by a plurality of retaining bolts 62′. Thus, the cutting blade 62 may be removed and replaced by removing and replacing the bolt 62′ in an obvious manner.

Attached centrally of each of the blades 53–56 is a tubular cylinder 63 connected to the blade adjacent the lower edge portion thereof by virtue of a pivot bolt 64. Slidably disposed within the cylinder 63 is a plunger 65 having a coil compression spring 66 encircling the same. An abutment member 67 is adjustably connected to the plunger 65 and engages the opposite end of the spring 66 and includes arms 68 extending adjustably through and being adjustably connected to a pair of lugs 69 carried by the plunger 65. The plunger 65 is also connected to the side frame rail either 12 or 14 by a pivot bolt and lug assembly 70 and the abutment 67 also includes a tapered sleeve 71 extending into the spring 66 for guiding the spring and centering the spring in relation to the plunger 65. With this construction, the blades 53–56 are held in a vertically disposed condition and the gusset plate 60 which support one end of the blades by virtue of a suitable bracket and pivot similar to the bracket 59 and equivalent thereto as to function is provided with a stop pin 72 which limits the forward swinging movement of the blades so that they will be retained in a vertical position unless an obstruction is encountered in which event the spring will be compressed and the blade permitted to swing rearwardly.

The rearmost end of the land leveler has the side rail 12 thereof provided with an upwardly offset portion 73 which forms an exit area for the soil discharged by the rearmost blade 56. Also, the particular arrangement of blades will assure that the soil will be moved four times during passage of the land level and the soil will travel in a generally zig-zag pattern and as it is rolled back and fourth laterally, the soil moved by the blades will fill up any low pockets or low areas in the surface of the soil and the blades will cut off and level any high areas.

Disposed adjacent the rear end of the frame, each side rail 12 and 14 is provided with an upstanding tubular standard 74 having braces 76 connected thereto and the standard 74 extends upwardly through and above the upper frame rails 20 and 22. A supporting plate 78 is attached to the upper end of the standard 74 and is provided with upstanding lugs 82 which receive and hold stationary a cylindrical sleeve 84 which journals a transverse pipe 86. Rigidly attached to the transverse pipe or axle 86 is a pair of trailing support arms 92 each of which is journalled on the outer end thereof the ground engaging supporting wheel assembly 94 which may conveniently be in the form of a pneumatic tire and wheel such as is used in conjunction with various farm machinery. Operating cables 90 have their rear ends connected to the respective arms 92 in spaced relation to the axle 86. Thus, by moving the cables, the transverse axle of pipe 86 may be rotated and the wheel assemblies 94 may be raised and lowered thus raising and lowering the rear portion of the frame.

Adjacent the front of the frame, there is also provided an upstanding standard 96 on each side of the frame rail 12 and 14 which standard has a supporting plate 98 on the upper end thereof carrying bearing sleeves for a transverse axle or pipe 102 which is parallel to the axle or pipe 86 and at substantially the same elevation. Centrally disposed on the axle or pipe 102 is an offset arm 104 rigid therewith to which is attached a fluid operated piston and cylinder assembly 106 of the double-acting type. The lower end of the piston and cylinder assembly 106 is connected to a lug 108 on the lower transverse pipe frame member 16. Thus, by the operator admitting or exhausting hydraulic pressure from the piston and cylinder assembly 106, the transverse axle or pipe 102 may be rotated about its longitudinal axis.

The outer ends of the axle 102 is provided with a depending offset arm 110 having a short piece or chain 112 attached thereto by virtue of a U-shaped loop and hook carried thereby which hook engages the chain in an adjustable manner and the cable 90 is attached to the chain by suitable cable clamps.

Rigidly attached to the transverse pipe or axle 102 is a sleeve bearing 114 which pivotally journals the mounting pin 116 of a front wheel assembly which includes a front wheel unit 118 supported by an arm 120 having an offset upper end portion 122 which is also offset rearwardly or angulated rearwardly in relation to the axis of the pin 116 due to an angulated portion 124 at the lower end of the pin 116. Thus, the wheels 118 are free to swivel about the axis of the pin 116. When the frame and blades are lowered, the pin 116 is slightly inclined forwardly and when the wheels 118 and the frame are elevated, the wheels 118 will still caster in the proper manner even though the pin 116 receives a slight rearward inclination. This construction enables the frame to be elevated and the device towed by a suitable towing vehicle over the road thus facilitating the handling of the leveler.

The tractor operator will control the operation of the land leveler since by controlling the fluid pressure supply and exhaust from the piston cylinder arrangement 106, the leveler may be elevated for over the road transport by expanding the piston and cylinder arrangement 106 which will lower the wheels 118 and 94 and as the tractor or towing vehicle proceeds around a curve, the front wheels 118 will pivot about the axis of the pins 116 thus permitting the land leveler to follow the towing vehicle. The land leveler transports easily by truck or car for long trips by simply locking the framework in elevated position without requiring the use of any hydraulic equipment and this may be accomplished very simply.

Interconnecting cables 90 assure that all of the wheels will move simultaneously for maintaining the relationship of the wheels and the frame. When it is desired to use the device for land leveling the piston and cylinder assembly 106 is contracted thus elevating the wheels 118 and 94 and letting the frame down toward the ground surface with the blades 53–56 engaging the ground surface. During forward movement of the tractor and the land leveler, the soil will be moved laterally and longitudinally substantially in a zig-zag path, effectively levelling off or filling in the pockets and high spots and also permitting the device to be used with wetter soil due to the angle of inclination of the blades which will assure movement of the soil to the land leveler. The angle of the blades also enables the machine to work in soil having a large percentage of straw, weeds, stubble or the like without the material choking the machine.

A very important factor concerning the blades is the pivotal mounting thereof which enables the blades to trip themselves if a rigid obstruction is engaged thereby. Quite often, it is desired to level soil which has a considerable number of stumps wherein which have been cut-off adjacent to the ground surface. This is especially desirable when new ground is being cleared for farming. This construction enables said soil to be effectively leveled and does not leave a load of soil on top of the stump which is a result of conventional transverse bladed land levelers since the four blades disposed in angular relation to each other will move the dirt effectively. For example, the trailing blade will move the dirt left by a forward blade so that there is only a little dirt that the back blade leaves around the stump. In other words, the blades actually work around both sides of the stump by the blades being disposed at different angles.

The operator of the leveler may elevate the frame slightly if desired in order to prevent too much dirt from piling up in front of the blades. Generally, the side frame rails 12 and 14 form a skid and engage the ground surface and since the lower edges of the blades are substantially coincidental with the lower edge of the frame rails, the frame rails will actually gauge the position of the blades for forming a smooth surface.

Where necessary, inclined brace members 124 may be employed for reinforcing the transverse pipes to which the blades are mounted and also, the ends of the blades connected with the ends of the side frame rails are normally in alignment with a stationary blade section 126 which is rigidly affixed to the side frame rails by welding or the like and the gusset plates 60 also serve to support the stationary blade sections 126 which are relatively narrow.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A land leveler comprising an elongated frame including a pair of parallel side frame rails and a plurality of transverse frame rails rigidly interconnected with the side rails thereby forming an elongated rigid frame, said transverse frame rails being disposed above the plane of the side rails whereby the side rails form runners for the frame, a transverse rear axle mounted on the frame for rotational movement about its longitudinal axis, a transverse front axle mounted on the frame for rotational movement about its longitudinal axis, means interconnecting the axles for simultaneous rotational movement thereof, means interconnecting the front axle and the frame for rotating the front axle about its longitudinal axis, a pair of supporting arms on the rear axle, rear wheels mounted on the supporting arms on the rear axle for movement in a vertical plane about the center of the rear axle when the rear axle is rotated, a pair of sleeves rigidly mounted on the front axle for rotation therewith, supporting arms swivelly mounted in said sleeve, each supporting arm having a front wheel mounted on the free end thereof remote from the sleeve, said supporting arms being received in the sleeves for pivotal movement generally about a vertical axis independently of each other and freely in relation to the sleeve and front axle whereby rotation of the front axle will cause vertical swinging movement of all of the wheels and change in inclination of the angle of pivotal movement of the supporting arms for the front wheels, a plurality of blades mounted on the frame, alternate blades having one end thereof attached adjacent the side rails and the opposite ends spaced laterally inwardly from the side rails, the longitudinal axis of the blades being inclined rearwardly in relation to the side rails, the rearmost blade extending completely between the side rails, the portion of the side rail adjacent the forward surface of the rear end of the rearmost blade being offset upwardly to permit exit of material from in front of the rearmost blade, each of said blades being pivotally mounted and automatically pivotable in response to the blades striking an obstruction for pivotal movement about a horizontal axis disposed adjacent the upper edge of the blades thereby enabling the leveler to pass over such obstruction.

2. The structure as defined in claim 1 wherein each of said blades includes an elongated L-shaped member having one flange extending vertically and the other flange extending horizontally rearwardly, and a cutting blade mounted detachably on and coextensive with the forward surface of said angle iron member.

3. The structure as defined in claim 1 wherein stop means is provided rigid with the frame for limiting the forward movement of each blade to substantially a vertical position, and spring means interconnecting the blades and the frame and resiliently biasing the blade against rearward pivotal movement.

4. The structure as defined in claim 3 wherein said spring means includes a telescoping plunger assembly, spring means urging the plunger assembly into extended position, one end of the plunger assembly being connected to the blade adjacent the lower end thereof, and the other end of the plunger assembly being connected with a side rail of the frame whereby rearward swinging movement of the lower edge of the blade will cause the plunger assembly to be compressed with such rearward swinging movement being resisted by the spring.

5. The structure as defined in claim 4 wherein the lower edge of each of the blades is substantially in the same horizontal plane as the lower edge of the side rails whereby the side rails will confine the soil being moved by the blades and form a skid for the frame.

6. A land leveler comprising an elongated rigid frame, simultaneously elevated wheel means mounted adjacent both ends of said frame for supporting both ends of said frame from the ground surface, said frame including side rails for supporting the frame when the wheel means are raised thereby allowing the frame to slide on the ground surface, means at the forward end of said frame for connection with a towing vehicle, means interconnecting the frame and the wheel means for raising and lowering the wheel means, and a plurality of elongated blades pivotally mounted on said frame, the longitudinal axes of the blades being in rearwardly inclined relation to the longitudinal axis of the frame, and spring means interconnecting the blades and the frame and biasing said blades into substantially vertical position.

7. The structure as defined in claim 6 wherein said blades are arranged with one end of alternate blades being attached to the same side of the frame and the other end being spaced laterally inwardly from the opposite side of the frame whereby soil will be engaged and moved longitudinally and laterally in a plurality of independent movement as the leveler passes thereover thus rolling and pulverizing the soil for more effectively filling low spots and also cutting off high spots.

8. The structure as defined in claim 7 wherein each of said blades is provided with a removable cutting edge.

9. The structure as defined in claim 8 wherein the rearmost of said blades extends completely across the frame, said frame having opening means at the rear corner forwardly of a rear end of the rearmost blades for enabling discharge of the soil therefrom.

10. A land leveler comprising an elongated rigid frame, simultaneously elevated wheel means mounted adjacent both ends of said frame for supporting both ends of said frame from the ground surface, said frame including side rails for supporting the frame when the wheel means are raised thereby allowing the frame to slide on the ground surface, means at the forward end of said frame for connection with a towing vehicle, means interconnecting the frame and the wheel means for raising and lowering the wheel means, and a plurality of elongated blades pivotally mounted on said frame, the longitudinal axes of the blades being in rearwardly inclined relation to the longitudinal axis of the frame, and spring means interconnecting the blades and the frame for retaining said blades in substantially vertical position, said blades being arranged with one end of alternate blades being attached to the same side of the frame and the other end being spaced laterally inwardly from the opposite side of the frame whereby soil will be engaged and moved longitudinally and laterally in a plurality of independent movements as the leveler passes thereover thus rolling and pulverizing the soil for more effectively filling low spots and also cutting off high spots, each of said blades being provided with a removable cutting edge, the rearmost of said blades extending completely across the frame, said frame having opening means at the rear corner forwardly of a rear end of the rearmost blades for enabling discharge of the soil therefrom, said spring means retaining the blades in vertical position including an elongated tubular member pivotally attached to the rear lower edge portion of each blade, a plunger slidable in said tube and being pivotally connected to the frame, a spring encircling the plunger and having one end abutting the end of the tube, lugs on said plunger engaging the other end of the spring whereby movement of the tube onto the plunger will be resisted thus normally retaining the blade in vertical position but enabling the blade to swing rearwardly in the event the blade engages a stationary obstruction such as a stump, rock or the like.

11. A land leveler comprising an elongated rigid frame, simultaneously elevated wheel means mounted adjacent both ends of said frame for supporting both ends of said frame from the ground surface, said frame including side rails for supporting the frame when the wheel means are raised thereby allowing the frame to slide on the ground surface, means at the forward end of said frame for connection with a towing vehicle, means interconnecting the frame and the wheel means for raising and lowering the wheel means, and a plurality of elongated blades pivotally mounted on said frame, the longitudinal axis of the blade being in rearwardly inclined relation to the longitudinal axis of the frame, and spring means interconnecting the blades and the frame for retaining said blades in substantially vertical position, said spring means retaining the blades in vertical position including an elongated tubular member pivotally attached to the rear lower edge portion of each blade, a plunger slidable in said tube and being pivotally connected to the frame, a spring encircling the plunger and having one end abutting the end of the tube, lugs on said plunger engaging the other end of the spring whereby movement of the tube onto the plunger will be resisted thus normally retaining the blade in vertical position but enabling the blade to swing rearwardly in the event the blade engages a stationary obstruction such as a stump, rock or the like.

12. A land leveler comprising an elongated rigid frame, said frame including side rails for supporting the frame thereby allowing the frame to slide on the ground surface, a plurality of elongated blades pivotally mounted on said frame, the longitudinal axes of the blades being in rearwardly inclined relation to the longitudinal axis of the frame, and spring means interconnecting the blades and the frame and biasing said blades into substantially vertical position, said spring means including a telescoping plunger assembly, spring means urging the plunger assembly into extended position, one end of the plunger assembly being connected to the blade adjacent the lower end thereof, and the other end of the plunger assembly being connected with a side rail of the frame whereby rearward swinging movement of the lower edge of the blade will cause the plunger assembly to be compressed with such rearward swinging movement being resisted by the spring.

13. The structure as defined in claim 10 wherein each of said blades is provided with a stationary section adjacent the forward end thereof, and a laterally extending stop member on the frame adjacent the stationary member extending in front of the swingable blade thereby limiting forward movement thereof.

14. The structure as defined in claim 10 wherein the forward ends of the side rails are upturned for enabling the side rails to pass over elevated areas or obstructions, said blades being suspended from the frame with the lower edge of the blade being substantially coincidental with the lower edge of the side frame rails providing an elongated rigid unit for covering an enlarged surface area so that irregularities in such a surface area will be effectively smoothed.

References Cited in the file of this patent

UNITED STATES PATENTS

| | | |
|---|---|---|
| 982,309 | Smith et al. | Jan. 24, 1911 |
| 1,317,037 | Samdahl | Sept. 23, 1919 |
| 1,934,488 | Dempster et al. | Nov. 7, 1933 |
| 2,093,766 | Rich | Sept. 21, 1937 |
| 2,513,129 | Allison et al. | June 27, 1950 |
| 2,697,289 | Standfuss | Dec. 21, 1954 |
| 2,881,540 | Sprague | Apr. 14, 1959 |
| 2,991,566 | Summer et al. | July 11, 1961 |